2,731,435
FREEZE RESISTANT AQUEOUS POLYMER BASED PAINT CONTAINING GUANIDINE THIOCYANATE

Paul H. Johnson, Akron, John H. Musch, Silver Lake, and Cullen W. Metzger, Massillon, Ohio, assignors to The Firestone Tire & Rubber Company, Akron, Ohio, a corporation of Ohio No Drawing. Application February 18, 1953, Serial No. 337,642

6 Claims. (Cl. 260—29.7)

This invention relates to water paints and more particularly to water paints containing an aqueous polymer dispersion.

Desirable water paints have recently been proposed having paint pigments dispersed in a synthetic polymer latex. By "latex" and "dispersion" is meant an aqueous colloidal suspension or emulsion, the dispersed particles of which possess an average diameter in the range of about ten milli-microns to one micron.

Synthetic polymer latices, suitable for paints of the above type, include those produced by aqueous polymerization of a polymerizable ethylenic compound either with itself or with one or more different polymerizable ethylenic compounds. Polymerizable ethylenic compounds include the conjugated dienes and the monoethylenically unsaturated compounds such as the vinyl aromatic compounds, the alpha methylene carboxylic acids and esters, nitriles, aldehydes, ketones, and amides thereof, the vinyl aliphatic compounds, the vinylidene compounds, the methylene hydrocarbons and the like. Suitable dienes are butadiene-1,3, isoprene, 2,3-dimethyl butadiene-1,3, piperylene, 2-chlorobutadiene-1,3, 2,3-dichlorobutadiene-1,3, 2-bromobutadiene-1,3, 2-fluorobutadiene-1,3, 2,3-difluorobutadiene-1,3, and the like. Suitable vinyl aromatic compounds are styrene, vinyl toluene, divinyl benzene, the nuclearly substituted styrenes such as the chlorostyrenes and alkyl styrenes, alpha-chlorostyrene, alpha-methylstyrene, vinyl naphthalene, vinyl pyridine, vinyl carbazole and the like. Examples of various of the alpha methylene compounds are acrylic acid, acrylamide, methyl acrylate, methyl methacrylate, methacrylic acid, methachylamide, acrolein, acrylonitrile, methacrylonitrile and the like. Vinyl aliphatic compounds include vinyl chloride, vinyl bromide, vinyl fluoride, vinyl acetate, vinyl propionate, vinyl formate, vinyl methyl ether, vinyl ethyl ether, divinyl methyl ketone, vinyl ethyl ketone, vinyl isobutyl ketone, divinyl ketone, vinyl ethyl sulfone, the vinyl thioethers, and the like. Suitable vinylidene compounds are vinylidene fluoride, 1-chloro-1-fluoroethene, vinylidene cyanide, and the like. Representative of the alpha methylene hydrocarbons are isobutene, ethylene and propylene. Polymerizable haloethylenes, such as chloro-trifluoroethylene, are also suitable monomers. Although homopolymers, either rubbery or resinous, are suitable, many of the more desirable synthetic polymers for water paints are copolymers of a minor proportion of a conjugated diene and a major proportion of a monoethylenically unsaturated compound. "Copolymer" is meant to include terpolymers and other interpolymers.

The polymerizations are effected in accordance with known procedures in the presence of the usual polymerization catalysts, and in the presence of emulsifying agents, buffers, catalyst activators, retarders, modifiers, and the like if desired.

The polymer latices can be mixed with most of the common paint pigments to produce a paint or coating composition of the water dispersion type, which dries to form an opaque film. The pigments can be added as dry powders to the latex if sufficient precautions, known to the art of compounding natural rubber latex, are taken to avoid coagulating the latex. However, it is preferred to form a water dispersion of the pigments first and then to mix this dispersion carefully with the latex.

Most paint pigments are hydrophobic and require the presence of a dispersing agent for the production of a water dispersion of the pigments suitable for mixing with the latex. Many of the dispersing agents known to the colloid art can be utilized, including the various water soluble soaps, the aliphatic or aromatic sulfonates, the sulfolignins, the aliphatic sulfates, and other anionic emulsifying agents on the market; various polyethers, ether-alcohol condensates and other nonionic emulsifying agents; and the various hydrophilic colloidal dispersing agents, including casein, soya bean protein and other animal and vegetable proteins (including albumens) capable of reacting with an alkaline material to become dispersible in water, cellulose ethers, such as methyl cellulose, and other water dispersible cellulose derivatives, as well as other hydrophilic colloids well known in the coloid art. Two or more dispersing agents may advantageously be used in a single paint.

Typical paint pigments which are successfully incorporated with the polymer latex into a paint include titanium dioxide (the anatase or rutile grade is satisfactory), clay, silica, lithopone, mica, barium sulfate, talc and zinc sulfide. Many dyes and colored pigments may be included in the pigment formulation, including carbon black, iron oxides, cadmium yellows, phthalocyanines, ultramarine, chromium oxides, umber and sienna.

An example of a satisfactory paint of the flat interior type is a white paint utilizing casein as the pigment dispersing agent. It is well known in the paint industry that casein can be readily made dispersible in water by treating it with a water solution of an alkaline material, including ammonium, sodium or potassium hydroxide or an alkaline salt such as borax, sodium or potassium carbonate. For example, 10 parts of dry casein are added to 56 parts, by weight, of soft water, and the mixture is allowed to stand at ordinary room temperature for 30 to 60 minutes. Then the mixture is stirred and warmed to about 60° C. One part of borax is added to the warm mixture with stirring, and the mixture is stirred for an additional 30 minutes at 60° C. The casein dispersion is allowed to cool. Preferably a fungicide is added to the casein dispersion to protect it and the resulting paint from mold, etc.; e. g., 2 to 3 parts of a 20% solution of Dowicide A[1] (and a corresponding reduction of the original water, employed for dispersing the casein, from 56 to 53 or 54 parts) is added to the cool casein dispersion.

A paint of the invention can be prepared in accordance with the following formula:

| Ingredients: | Parts by weight |
|---|---|
| Pigment(s) | 20 to 40 |
| Water | 14 to 30 |
| Casein dispersion | 1 to 10 |
| Antifoaming agent | 0.75 to 3 |
| Polymer latex | 20 to 55 |

A somewhat more detailed formula is:

| Ingredients: | Parts by weight |
|---|---|
| Titanium dioxide | 2 to 25 |
| Lithopone | 3 to 12 |
| Silica and silicates | 4 to 12 |
| Color (if desired) | 3 to 12 |
| Water | 14 to 30 |
| Protein—dry (as a dispersion) | 1 to 3 |
| Antifoaming agent | 0.75 to 3 |
| Polymerized oil | 1 to 6 |
| Polymer latex | 25 to 55 |

[1] Sodium salt of ortho-phenyl phenol.

The ingredients are chosen in the ranges shown in the above formulas, depending upon the specific paint properties desired. The paint is prepared by mixing the ingredients in a can by means of a conventional paddle stirrer. The water preferably containing about one per cent of $Na_4P_2O_7$ or other soluble phosphate as a pigment dispersant, is stirred while the pigments or mixture of pigments is added. The mixture is stirred for several minutes to insure thorough wetting of the pigment. Then the casein dispersion is added and the mixture is stirred until uniform in appearance. An antifoaming agent, such as pine oil, tributyl phosphate or similar oily antifoamer is then added. Additional fungicide, amounting to 1 to 2 parts, can be added at this point to improve the resistance of the paint to fungi attack. Then the polymer latex is carefully added, with slow stirring, so as to avoid formation of foam, and the paint is slowly stirred for an additional period of 15 to 30 minutes. The mixed paint is then filtered, if desired, and is ready for use or packaging.

Polymer-containing water paints, of the general type above referred to, tend to thicken and often to coagulate when subjected to low temperatures such as those which prevail in many geographical localities during winter. This is particularly true if the temperature is ever sufficiently low to cause the paint to freeze. Paints which have coagulated are solid and are no longer suitable as paints. Ease of application of a paint influences greatly the customer-acceptance of the paint. For this reason, present paint manufacturers strive to produce paints which require no adjustment by the customer prior to application, that require no thinning or thickening before use, and that have uniform predictable properties such as covering power and the like.

Viscosity of a paint is adjusted by the manufacturer to a value which is optimum for ultimate use. If, subsequent to packaging, the viscosity of the paint increases radically from this optimum value, many difficulties attend the use of the paint. First of all, the paint must be thinned to permit satisfactory brushing, spraying or other application of the paint to a surface to be painted. Since the solids-liquid ratio of the paint has been designed to give optimum covering power, optimum hiding power, and uniformity of other properties, thinning of these finished paints can so fundamentally change the paint as to result in inferior covering and non-uniformity of other desirable properties. In this regard it should be borne in mind that paints of this type are often used by unskilled painters who often over-thin the paint with undesirable results. Paints, which thicken excessively after freezing or thawing, or which coagulate on freezing, therefore, require special precautionary handling to prevent their freezing. This requirement for special precautionary handling of these paints is costly, cumbersome and detracts greatly from the universal acceptance of such paints.

Proposals have recently been advanced to render certain of the water paints of the types discussed above essentially freeze resistance. As used herein, "freeze resistance" or "freeze stability" of a paint refers to the relative ability of the paint to withstand freezing and thawing without coagulation or excessive thickening. Many of these proposals have been concerned with special techniques of polymerization. For example, freeze stability of a water paint containing a polymer dispersion is greatly improved if the polymer dispersion is produced by a method which results in a relatively large particle size latex. Large particle size synthetic latices can be prepared by several means, one of which contemplates polymerization of monomer in an aqueous medium in the presence of relatively large proportions of a soluble salt of persulfuric acid as a catalyst (e. g. about 1% or more catalyst on the weight of monomer) and the absence, or presence of only a very small amount, of an initial emulsifying agent.

Freeze stability of water paints has also been considerably enhanced by special additional stabilization of the polymer dispersion at some point or points subsequent to the initial stages of polymerization, for example, by addition of surface active stabilizers to the polymer latex, to the pigment dispersion or to the finished paint. Suitable additional stabilizers of this type include anionic stabilizers, nonionic stabilizers or often more desirably a mixture of one or more stabilizers of each type.

While the above proposed improvements of freeze stability of polymer-containing water paints have contributed much to the problem involved, nevertheless they have not entirely alleviated the difficulties. One factor, which detracts somewhat from the effectiveness of any of these proposals in commercial production, is the sensitivity of the latex and paint systems to slight variations of production conditions or quality of ingredients used. Desirable results are, therefore, reproduced with great difficulty. For example, commercially available materials of the same grade often vary sufficiently in quality, even though originating from the same supplier, to cause freeze-instability of an otherwise freeze-stable water paint. Similarly, variations in the conditions of polymerization, which are so slight as not readily to admit of practical control in a commercial operation, adversely affect the freeze stability of the polymer-containing paint.

An object therefore is to provide a polymer-containing water dispersion paint which will not coagulate or thicken excessively when subjected to freezing and subsequent thawing conditions. Another object is to provide a method for producing polymer-containing water paints which neither coagulate nor thicken excessively when subjected to freezing and thawing conditions, despite slight variations of conditions of preparation or quality of ingredients. Another object is to provide a polymer-containing water paint which is freeze stable. Still another object is to provide a method of improving the freeze stability of existing polymer-containing water paints.

The above and further objects are obtained in accordance with the invention by incorporating guanidine thiocyanate in a polymer-containing water paint. In practicing the invention guanidine thiocyanate is introduced into the polymer latex after polymerization and before addition of paint pigment, or into an otherwise finished polymer-containing water paint.

As an illustration of the practice of the invention reference may be had to the following example. A polymer latex was produced by polymerization of the following polymerization recipe:

| Ingredients: | Parts by weight |
| --- | --- |
| Butadiene | 37.0 |
| Styrene | 63.0 |
| Potassium persulfate | 1.3 |
| MP–189–S* | 0.4 |
| $Na_2B_4O_7.10H_2O$ | 1.6 |
| Water | 135.0 |

* An alkyl sodium sulfonate supplied by E. I. du Pont de Nemours & Company.

The reactants were agitated and maintained at a temperature of 70° C. to effect polymerization. At about 60% polymerization conversion 2.2 parts by weight of Nacconol NRSF [2] was injected into the reaction mixture and polymerization was then carried to completion. The resulting latex was then further stabilized by addition thereto of 3.0 parts by weight of Triton X–100 [3] and 2.0 parts by weight of ammonium linseed oil fatty acid, both per 100 parts of polymer.

An aqueous paint pigment dispersion was prepared in accordance with the preceding detailed description. Two paint samples were then prepared by, in each instance, mixing together 180.5 grams of this pigment dispersion with a portion of the above polymer latex containing 32.8 grams polymer. One of the paint samples (not in accordance with the invention and hereafter referred

[2] An alkaryl sulfonate supplied by National Aniline Division of the Allied Chemical & Dye Corporation.
[3] A polyether alcohol type non-ionic emulsifier supplied by Resinous Products & Chemical Company.

to as Sample A) was maintained as a control. The other paint sample (hereafter referred to as Sample B) was treated in accordance with the invention by adding thereto 5.6 grams guanidine thiocyanate (14 per cent guanidine thiocyanate based on the weight of polymer). The viscosity of each of the paint samples was adjusted to the values appearing under the designation "Before freeze" in the table below. Viscosity determinations are reported in seconds and were made by filling a 90 ml. conical brass cup, having a bottom orifice 0.277 inch in diameter, with paint and measuring the time in seconds for the paint to flow through the cup orifice until the stream of paint broke (viscosity determinations were made at 23 to 25° C.). Each of the paint samples was placed in a half pint metal can and the can was covered. The metal cans were placed in a freezing chamber and maintained at −25° C. for 16 hours. The cans were then removed from the freezing chamber and the solidly frozen contents were allowed to thaw at room temperature. When the contents of the cans had reached room temperature, they were observed. None of the paint samples had coagulated and, therefore, they both could be said to have some degree of freeze stability. Relative freeze stability of paints which do not coagulate upon freezing and thawing can be characterized by the relative viscosities of the paints. Viscosity determinations were, therefore, made upon each of the thawed paint samples according to the procedure previously outlined. After the freeze characteristics of the paint samples had been observed after one freezing and thawing cycle the cans were again covered and the contents thereof subjected to succeeding identical freezing and thawing cycles until the paint became too viscous to permit viscosity determination by the method outlined or had been subjected to four freezing and thawing cycles.

Relative freeze stability of paints sometimes becomes more apparent by noting and comparing the changes (increase) in viscosity brought about by freezing and thawing the paints. For convenience, this change for each paint sample is reported hereafter as $\Delta\mu$ which is obtained by subtracting the original viscosity in seconds (before initial freezing) from the viscosity in seconds after any particular freezing cycle. Unless indicated otherwise $\Delta\mu$ hereafter refers to the fourth freezing cycle.

The freeze characteristics of the paint samples are set out as follows:

| | Viscosities in Seconds | | | | | |
|---|---|---|---|---|---|---|
| | Before Freeze | First Freeze | Second Freeze | Third Freeze | Fourth Freeze | $\Delta\mu$ |
| Sample A | 9.4 | 30 | [1] TVTM | | | [2] >20 |
| Sample B | 10.2 | 14.0 | 19.6 | 20.2 | 21.2 | 11 |

[1] Too viscous to measure viscosity according to the above procedure.
[2] $\Delta\mu$ in this instance is reported for the first freeze cycle.

Referring to the above data, it is seen that sample A (not according to the invention) was too viscous for use without thinning after the first freezing and thawing cycle; its viscosity had increased more than 20 seconds after one freeze cycle and its viscosity was too great to measure after the second freeze cycle. Sample B, containing guanidine thiocyanate in accordance with the invention required, on the other hand, no additional treatment before use even after being subjected to all of the four severe freezing and thawing cycles. It should be noted at this point that greater amounts of anionic or nonionic surface active stabilizers, such as those used above as additional stabilizers for the polymer latex, do not additionally improve the freeze stability of paints such as the paint of sample A.

Guanidine thiocyanate was used in the above example in an amount of the order of about 15% based on the weight of polymer. However, desirable results in accordance with the invention are realized by the use of larger or smaller amounts, for example from about 5 to 30 per cent based on the weight of polymer. Ordinarily, for economic considerations, relatively small quantities of the guanidine thiocyanate are to be preferred. Since variations of polymer-containing paint, both in constitution and methods of making, will control somewhat the optimum quantities of guanidine thiocyanate and these optimum quantities can readily be determined by those skilled in the art, it should be understood that the invention is not limited to precise proportions of this compound. The preceding example is merely illustrative of the invention and practice thereof and it should be remembered that many variations can be made without departing from the spirit and the scope of the invention.

What is claimed:

1. An improved freeze-stable water dispersion paint consisting essentially of a mixture of a synthetic polymer latex, about 5 to about 30 parts by weight guanidine thiocyanate per 100 parts polymer and water-dispersed paint pigment, said latex being produced by aqueous polymerization of polymerizable ethylenically unsaturated monomers including a conjugated diene, in the presence of at least about 1.0 part by weight of a soluble salt of persulfuric acid per 100 parts of monomers, and said paint containing additional surface active stabilizing emulsifying agent added after 50% polymerization conversion of said monomers.

2. Method of producing a polymer-containing water paint having improved stability to freezing and thawing which comprises mixing a polymer latex, produced by copolymerizing a conjugated diene and a monoethylenic compound polymerizable with said diene in an aqueous emulsion in the presence of a soluble salt of persulfuric acid, with about 5 to about 30 parts by weight guanidine thiocyanate per 100 parts polymer and a water-dispersed paint pigment.

3. An oil-in-water emulsion paint containing a polymer of a polymerizable ethylenically unsaturated compound and a quantity of guanidine thiocyanate which is relatively small in relation to the quantity of said polymer, said paint having improved freeze-stability.

4. Method of improving the freeze stability of an oil-in-water emulsion paint containing a polymer of a polymerizable ethylenically unsaturated compound, which comprises adding thereto about 5 to about 30 parts by weight guanidine thiocyanate per 100 parts polymer.

5. Method of producing a polymer-containing water paint having improved stability to freezing and thawing which includes mixing together an aqueous latex of a polymer of a polymerizable ethylenically unsaturated compound, an aqueous dispersion of paint pigments and about 5 to about 30 parts by weight guanidine thiocyanate per 100 parts polymer.

6. An oil-in-water emulsion paint containing a polymer of a polymerizable ethylenic compound, water-dispersed paint pigment and about 5 to about 30 parts by weight guanidine thiocyanate per 100 parts polymer.

References Cited in the file of this patent

UNITED STATES PATENTS 2,533,224    Cresswell _____ Dec. 12, 1950